R. I. BORDNER & A. E. EBERHART.
CHILD'S WAGON.
APPLICATION FILED NOV. 3, 1916.
1,234,614.
Patented July 24, 1917.
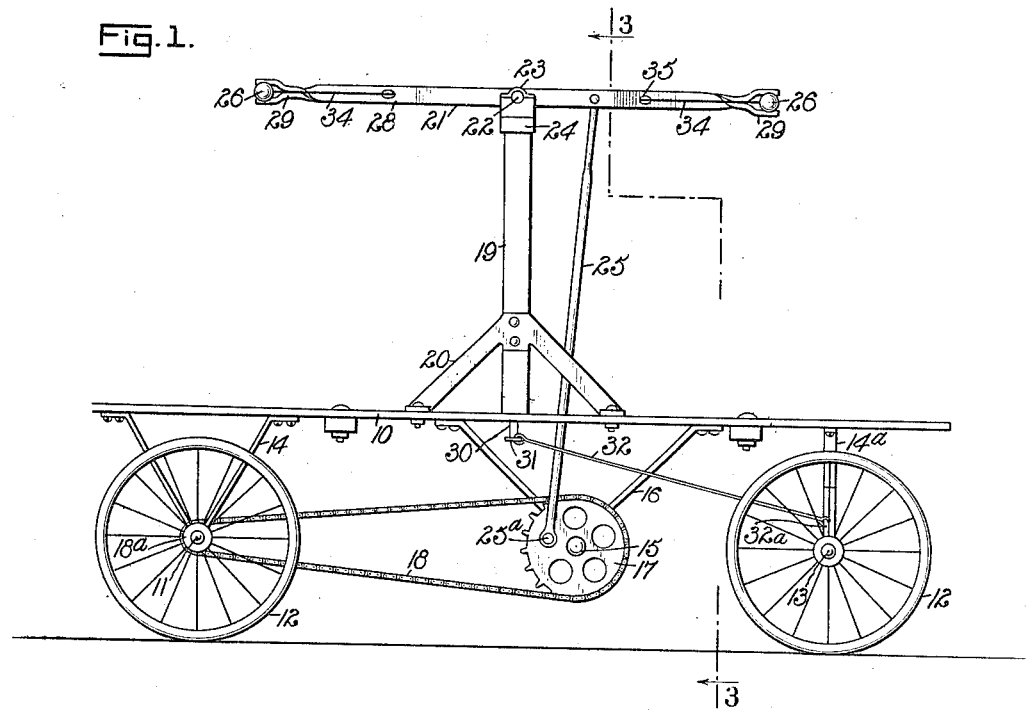
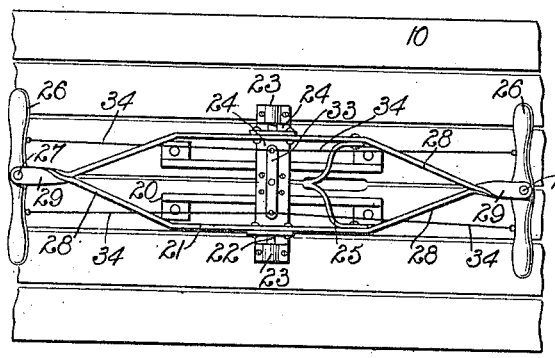
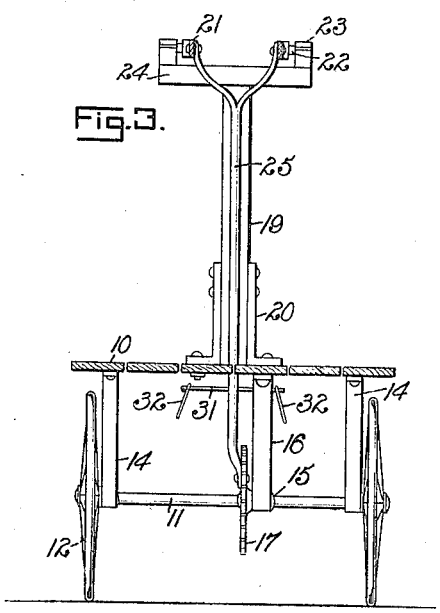
WITNESSES
INVENTORS
August E. Eberhart
Robert I. Bordner
BY
ATTORNEYS

UNITED STATES PATENT OFFICE.

ROBERT IMMANUEL BORDNER AND AUGUST ERNEST EBERHART, OF BROCK, SASKATCHEWAN, CANADA.

CHILD'S WAGON.

1,234,614.   Specification of Letters Patent.   Patented July 24, 1917.

Application filed November 3, 1916.   Serial No. 129,316.

*To all whom it may concern:*

Be it known that we, AUGUST E. EBERHART, American citizen, and ROBERT IMMANUEL BORDNER, citizen of Canada, and residents of Brock, Saskatchewan, in the Dominion of Canada, have invented new and Improved Children's Wagons, of which the following is a full, clear, and exact description.

Our invention relates to a hand-propelled wagon. The invention has for its general objects to provide an efficient propelling means simple in construction and easy of operation; and to provide a steering means associated with the propelling means but adapted to be operated and controlled without affecting the movements or positions of the propelling means. The stated objects are attained by providing a wheeled driven axle, a drive element having driving connections with the driven axle, and a vertically rocking propelling lever having a pitman connection with the drive element; together with handles pivoted on the vertically rocking lever at the ends thereof for movement in planes transverse to the plane of operation of the lever, and a steering post connected at its upper end with the pivoted handles, and at its lower end with a wheeled steering axle, whereby the handles may be turned on their pivots to control the steering axle without affecting the propelling lever or its movements and regardless of the particular position occupied by the lever during a propelling stroke thereof.

The nature of the invention and its advantages will more clearly appear as the description proceeds.

Reference is to be had to the accompanying drawings forming a part of this specification in which similar reference characters indicate corresponding parts in all the views.

Figure 1 is a side elevation of a toy wagon embodying our invention;

Fig. 2 is a partial plan view;

Fig. 3 is a transverse vertical section on the line 3—3, Fig. 1.

In carrying out our invention in accordance with the particular example given as an illustration, a suitable frame is provided including a platform 10. A rear driven axle 11 has running wheels 12, there being a front steering axle 13 equipped also with running wheels 12. The respective axles may be suitably supported, there being shown for the rear axle, hangers 14. The axle support 14$^a$ for the steering axle 13 may be of any approved arrangement as the same does not form part of our invention.

A short drive axle 15 is supported in a hanger 16 or equivalent means on the platform 10 and revolubly mounts a drive sprocket 17 over which a chain 18 runs, said chain running also over a suitable sprocket on the driven axle 11 as indicated at 18$^a$.

The drive element 17 is actuated by a vertically rocking lever 21 which is fulcrumed intermediate its ends by trunnions 22 which turn in bearings 23 on a cross bar 24 on the upper end of the standard 19 rising from the platform 10, the standard being provided in practice with braces 20. A pitman 25 is pivotally connected at its upper end with the lever 21, and secured at its lower end to a wrist pin 25$^a$ on the drive sprocket 17. It will be seen that the lever rocks in a fixed vertical plane at all times and that its movements will, through the pitman 25 or equivalent means, actuate the drive sprocket 17 and thereby turn the driven axle 11 for propelling the wagon.

The lever 21 has cross handles 26 at the ends thereof and these handles are made to constitute part of a steering means, each handle being pivotally mounted as at 27 on the lever to turn in a plane transverse to the plane of operation of the lever. That is to say, the handle turns in the axial plane of the lever. The lever is formed with separated side bars which converge toward the ends of the lever as at 28, the meeting ends 29 being flattened and forked as best seen in Fig. 1 to receive the respective handles 26 and the pivot pins 27 thereof.

A steering post 30 extends vertically through the standard 19 and the lower projecting end thereof has a cross bar 31 from which diverging steering rods 32 extend forwardly to the steering axle 13. The rods 32 are made fast at their front ends to any suitably fixed members 32$^a$ on the said axle. Connection between the handles 26 and the upper end of the steering post 30 is effected as follows: On the upper end of said steering post is a cross arm 33 from which wires or equivalent elements 34 extend in opposite directions, that is to say, forwardly and rearwardly to a connection with the respective handles 26 at opposite sides of the pivots 27 of said handles. Said wires or equivalent elements 34 pass freely through holes 35 in the converging members 28 of the lever 21.

With the described steering means, it will be clear that the handles 26 not only serve for rocking the lever 21 but the said handles may turn the steering post 30 in opposite directions by proper pivotal movements of the handles 26 and this regardless of the angular position of the lever 21 and without in any way affecting the operation of the said lever. Moreover, the elements 34 being free to follow the vertical movements of the lever by flexing vertically, and free also to respond to the pivotal movements of the handles are in no way affected by the movements of the lever and are therefore not subjected to distorting strains at any time.

Having thus described our invention we claim as new and desire to secure by Letters Patent:

1. A toy wagon including a frame, a driven axle, a steering axle, running wheels on said axle, a revoluble drive element, drive connections between the said drive element and the driven axle, a hollow standard on said frame, a propelling lever fulcrumed on said standard to rock in a vertical plane, a pitman connected with the lever and with the drive element, a steering post turnable in said standard, steering connections between the lower end of the steering post and the steering axle, a cross handle pivoted between its ends on said lever to turn in a plane transverse to the plane of operation of the lever, and means connecting the upper end of the steering post with the said handle at opposite sides of the pivot of the handle.

2. A toy wagon including a frame, a driven axle, a steering axle, running wheels on said axles, a revoluble drive element, drive connections between the said drive element and the driven axle, a standard on said frame, a propelling lever fulcrumed at its approximate center on said standard to rock in a vertical plane, a pitman connected with the lever and with said drive element, a steering post mounted to turn at the approximate center of the lever, steering connections between the lower end of the said steering post and the steering axle, cross handles pivoted between their ends on said lever at the opposite ends thereof to turn relatively to the lever in a plane transverse to the plane of operation of the lever, a cross arm fixed on said steering post at the top, and steering elements connected with the opposite ends of the said cross arm and with the respective handles at opposite sides of the pivots of the handles.

3. A toy wagon including a frame, a driven axle, a steering axle, running wheels on said axles, a revoluble drive element, drive connections between the said drive element and the driven axle, a standard on said frame, a propelling lever fulcrumed at its approximate center on said standard to rock in a vertical plane, a pitman connected with the lever and with said drive element, a steering post mounted to turn at the approximate center of the lever, steering connections between the lower end of the said steering post and the steering axle, cross handles pivoted between their ends on said lever at the opposite ends thereof to turn relatively to the lever in a plane transverse to the plane of operation of the lever, a cross arm fixed on said steering post at the top, and steering elements connected with the opposite ends of the said cross arm and with the respective handles at opposite sides of the pivots of the handles, said lever comprising side bars outside of the said cross arm, said side bars being convergent toward the ends and having their extremities united and spaced, said spaced ends accommodating the said handles and receiving the pivots thereof, the convergent portions of the side bars having holes therein for the free passage therethrough of the elements connecting the cross arm of the steering post with the handles.

ROBERT IMMANUEL BORDNER.
AUGUST ERNEST EBERHART.

Witnesses:
HARRY T. GOULÉ,
W. A. RIFE.

Copies of this patent may be obtained for five cents each, by addressing the "Commissioner of Patents, Washington, D. C."